US012659976B2

(12) United States Patent
Matsumura et al.

(10) Patent No.: US 12,659,976 B2
(45) Date of Patent: Jun. 16, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 387 days.

(21) Appl. No.: 17/917,720

(22) PCT Filed: Apr. 8, 2020

(86) PCT No.: PCT/JP2020/015831
§ 371 (c)(1),
(2) Date: Oct. 7, 2022

(87) PCT Pub. No.: WO2021/205572
PCT Pub. Date: Oct. 14, 2021

(65) Prior Publication Data
US 2023/0164805 A1      May 25, 2023

(51) Int. Cl.
H04W 72/30           (2023.01)
H04W 72/1273         (2023.01)

(52) U.S. Cl.
CPC ....... H04W 72/30 (2023.01); H04W 72/1273 (2013.01)

(58) Field of Classification Search
CPC . H04W 72/30; H04W 72/1273; H04W 72/11; H04W 72/231; H04W 4/06; H04L 5/0044; H04L 5/0094
See application file for complete search history.

(56)                References Cited

U.S. PATENT DOCUMENTS

| | | |
|---|---|---|
| 2018/0049060 A1 | 2/2018 | Fujishiro et al. |
| 2019/0320469 A1 | 10/2019 | Huang et al. |
| 2019/0394759 A1* | 12/2019 | Ying ..................... H04L 1/0061 |
| 2021/0037500 A1* | 2/2021 | Liu ........................ H04L 1/1854 |
| 2021/0160879 A1* | 5/2021 | Lin ................... H04W 72/0453 |
| 2022/0159692 A1* | 5/2022 | Lee ....................... H04L 5/0053 |

FOREIGN PATENT DOCUMENTS

| | | |
|---|---|---|
| CN | 110380834 A | 10/2019 |
| WO | 2016/121859 A1 | 8/2016 |
| WO | 2016/163548 A1 | 10/2016 |

OTHER PUBLICATIONS

Office Action issued in Japanese Patent Application No. 2022-513774, mailed on May 21, 2024 (6 pages).
International Search Report issued in PCT/JP2020/015831 on Nov. 24, 2020 (2 pages).

(Continued)

*Primary Examiner* — Thomas R Cairns
*Assistant Examiner* — Raenita Ann Fenner
(74) *Attorney, Agent, or Firm* — Osha Bergman Watanabe & Burton LLP

(57)                ABSTRACT

A terminal according to one aspect of the present disclosure includes a receiving section that receives data in at least one occasion of a plurality of occasions configured by higher layer signaling, the data being multicasted in the plurality of occasions, and a control section that decodes the data. According to one aspect of the present disclosure, it is possible to appropriately receive downlink data with multicast.

5 Claims, 15 Drawing Sheets

(56)　　　　References Cited

OTHER PUBLICATIONS

Written Opinion of the International Searching Authority issued in PCT/JP2020/015831 on Nov. 24, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Chinese Application No. 202080101649.6; Dated Aug. 21, 2024 (11 pages).

\* cited by examiner

FIG. 7A

MULTICAST PDSCH

DMRS

COMB INDEX = 0
INFORMATION = 0

FIG. 7B

MULTICAST PDSCH

DMRS

COMB INDEX = 1
INFORMATION = 1

FREQUENCY

TIME

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), it is assumed that a plurality of user terminals (User Equipments (UEs)) perform communication under ultra-high-density and high-traffic environments.

In NR, it is assumed that the plurality of UEs perform reception of downlink data using multicast under such environments.

However, for NR specifications thus far, downlink data reception by the UEs with multicast has not been fully studied. Unless the downlink data reception using multicast is performed appropriately, system performance degradation, such as throughput reduction, may occur.

Thus, an object of the present disclosure is to provide a terminal, a radio communication method, and a base station that appropriately receive downlink data with multicast.

Solution to Problem

A terminal according to one aspect of the present disclosure includes a receiving section that receives data in at least one occasion of a plurality of occasions configured by higher layer signaling, the data being multicasted in the plurality of occasions, and a control section that decodes the data.

Advantageous Effects of Invention

According to one aspect of the present disclosure, it is possible to appropriately receive downlink data with multicast.

BRIEF DESCRIPTION OF DRAWINGS

FIGS. 7A and 7B are each a diagram to show an example of an indication based on a DMRS;

Figure 1:
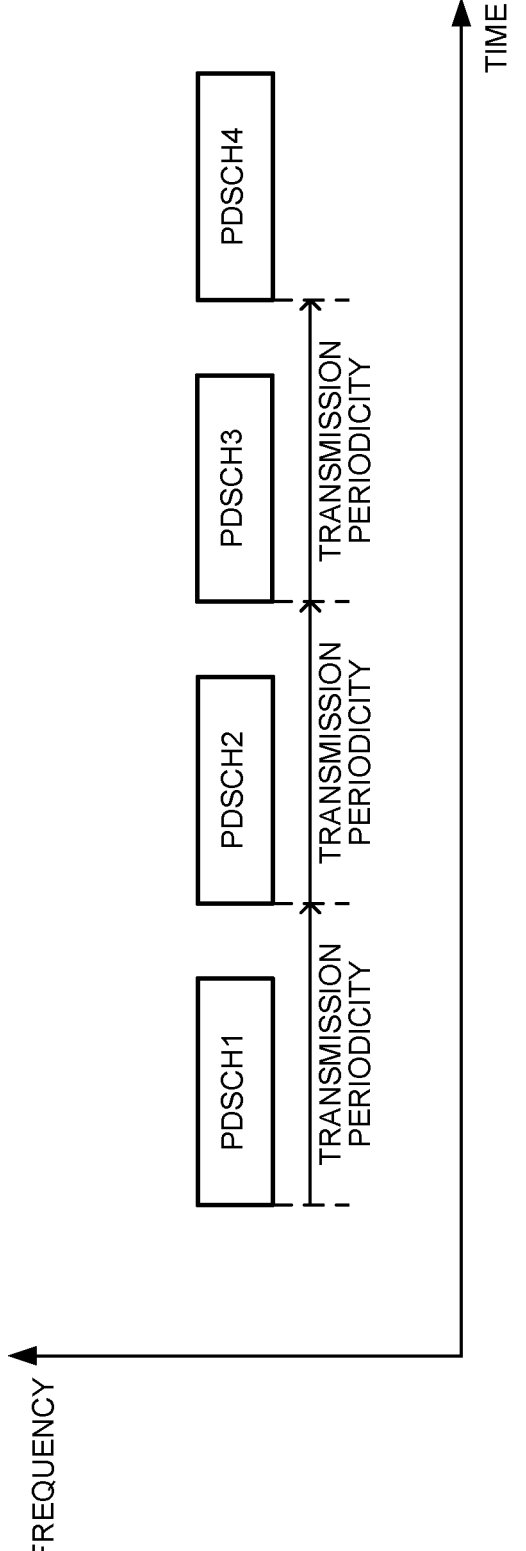
FIG. 1 is a diagram to show an example of configuration of multicast PDSCH resources.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (expressed as a signal/channel) in a UE based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

Note that in the present disclosure, a DL TCI state, a UL spatial relation, and a UL TCI state may be interchangeably interpreted.

QCL is an indicator indicating statistical properties of the signal/channel. For example, when a given signal/channel and another signal/channel are in a relationship of QCL, it may be indicated that it is assumable that at least one of a Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (designated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The UE may receive configuration information (for example, PDSCH-Config, tci-StatesToAddModList) including a list of information elements of the TCI state by using higher layer signaling.

An information element of the TCI state ("TCI-state IE" of RRC) configured by higher layer signaling may include a TCI state ID and one or a plurality of pieces of QCL information ("QCL-Info"). The QCL information may include at least one of information related to the RS to have a QCL relationship (RS relation information) and information indicating a QCL type (QCL type information). The RS relation information may include information about an index of the RS (for example, an SSB index, or a non-zero power (NZP) CSI-RS resource ID (Identifier)), an index of a cell in which the RS is located, an index of a Bandwidth Part (BWP) in which the RS is located, and the like.

In Rel-15 NR, as the TCI state for at least one of the PDCCH and PDSCH, both an RS of QCL type A and an RS of QCL type D or only the RS of QCL type A can be configured for the UE.

When the TRS is configured as the RS of QCL type A, it is assumed that, unlike a demodulation reference signal (DMRS) for the PDCCH or PDSCH, the same TRS is periodically transmitted for a long time. The UE can measure the TRS to calculate an average delay, a delay spread, and the like.

The UE for which the TRS has been configured as the RS of QCL type A with respect to a TCI state for the DMRS for the PDCCH or PDSCH can assume that parameters of QCL type A (average delays, delay spreads, and the like) of the DMRS for the PDCCH or PDSCH and the TRS are the same, and thus can obtain parameters of type A (an average delay, a delay spread, and the like) of the DMRS for the PDCCH or PDSCH on the basis of a measurement result of the TRS. When performing a channel estimation of at least one of the PDCCH and PDSCH, the UE can perform the channel estimation with higher accuracy by using the measurement result of the TRS.

The UE for which the RS of QCL type D has been configured can determine a UE receive beam (spatial domain reception filter, UE spatial domain reception filter) by using the RS of QCL type D.

An RS of QCL type X in a TCI state may mean an RS being in a QCL type X relationship with a given channel/signal (for the DMRS), and this RS may be referred to as a QCL source of QCL type X in the TCI state.

<TCI State for PDCCH>

Information related to QCL between a PDCCH (or a DMRS antenna port related to the PDCCH) and a given RS may be referred to as a TCI state for the PDCCH and so on.

The UE may judge a TCI state for a UE-specific PDCCH (CORESET) on the basis of higher layer signaling. For example, one or a plurality (K) of TCI states may be configured by RRC signaling for the UE for each CORESET.

For each CORESET, one of the plurality of TCI states configured by the RRC signaling may be activated by a MAC CE for the UE. The MAC CE may be referred to as a MAC CE for TCI state indication for a UE-specific PDCCH (TCI State Indication for UE-specific PDCCH MAC CE). The UE may perform CORESET monitoring on the basis of an active TCI state corresponding to the CORESET.

<TCI State for PDSCH>

Information related to QCL between a PDSCH (or a DMRS antenna port related to the PDSCH) and a given DL-RS may be referred to as a TCI state for the PDSCH and so on.

M (M≥1) TCI states for the PDSCH (M pieces of QCL information for the PDSCH) may be notified (configured) for the UE by higher layer signaling. Note that the number M of TCI states configured for the UE may be limited by at least one of UE capability and a QCL type.

DCI used for PDSCH scheduling may include a field indicating a TCI state for the PDSCH (which may be referred to as, for example, a TCI field, a TCI state field, and so on). The DCI may be used for PDSCH scheduling in one cell, and may be referred to as, for example, DL DCI, DL assignment, DCI format 1_0, DCI format 1_1, and so on.

Whether the TCI field is included in the DCI may be controlled by information notified to the UE from a base station. The information may be information (for example, TCI presence information, presence information of TCI in DCI, or higher layer parameter TCI-PresentInDCI) indicating whether the TCI field is present or absent in the DCI. For example, the information may be configured for the UE by higher layer signaling.

When more than eight kinds of TCI states are configured for the UE, eight or less kinds of TCI states may be activated (or designated) with use of a MAC CE. The MAC CE may be referred to as a MAC CE for TCI state activation/deactivation for a UE-specific PDSCH (TCI States Activation/Deactivation for UE-specific PDSCH MAC CE). A value of the TCI field in the DCI may indicate one of the TCI states activated by the MAC CE.

When the TCI presence information set to "enabled" for a CORESET to schedule a PDSCH (CORESET used for PDCCH transmission to schedule the PDSCH) is configured for the UE, the UE may assume that the TCI field is present in DCI format 1_1 for a PDCCH transmitted on the CORESET.

In a case where the TCI presence information is not configured for a CORESET to schedule a PDSCH or the PDSCH is scheduled by DCI format 1_0, when time offset between reception of DL DCI (DCI to schedule the PDSCH) and reception of a PDSCH corresponding to the DCI is equal to or greater than a threshold value, the UE may assume that, for determination of QCL of a PDSCH antenna port, a TCI state or QCL assumption for the PDSCH is identical to a TCI state or QCL assumption applied to a CORESET used for PDCCH transmission to schedule the PDSCH.

In a case where the TCI presence information is set to "enabled," when a TCI field in DCI in a component carrier (CC) to schedule (a PDSCH) indicates an activated TCI state in a CC or DL BWP to be scheduled and the PDSCH is scheduled by DCI format 1_1, for determination of QCL of the PDSCH antenna port, the UE may use a TCI according to a value of a TCI field in a detected PDCCH having the DCI. When time offset between reception of DL DCI (to schedule the PDSCH) and a PDSCH corresponding to the DCI (PDSCH scheduled by the DCI) is equal to or greater than a threshold value, the UE may assume that a DM-RS port for a PDSCH of a serving cell is QCL with an RS in a TCI state related to a QCL type parameter given by an indicated TCI state.

When a single-slot PDSCH is configured for the UE, the indicated TCI state may be based on an activated TCI state in a slot having the scheduled PDSCH. When a multi-slot PDSCH is configured for the UE, the indicated TCI state may be based on an activated TCI state in the first slot having the scheduled PDSCH, and the UE may expect that the indicated TCI state is identical through slots having the scheduled PDSCH. In a case where a CORESET associated with a search space set for cross-carrier scheduling is configured for the UE, when TCI presence information is set to "enabled" with respect to the CORESET for the UE and at least one of TCI states configured for a serving cell scheduled by the search space set includes QCL type D, the UE may assume that time offset between a detected PDCCH and a PDSCH corresponding to the PDCCH is equal to or greater than a threshold value.

In an RRC connected mode, in both a case where information of TCI in DCI (higher layer parameter TCI-PresentInDCI) is set to "enabled" and a case where the information of TCI in DCI is not configured, when time offset between reception of DL DCI (DCI to schedule a PDSCH) and a corresponding PDSCH (PDSCH scheduled by the DCI) is less than a threshold value (application condition, first condition), the UE may assume that the DM-RS port for the PDSCH of the serving cell has the lowest (minimum) CORESET-ID in the latest (most recent) slot in which one or more CORESETs in an active BWP for the serving cell are monitored by the UE and the DM-RS port is QCL with an RS related to a QCL parameter used for QCL indication of a PDCCH for a CORESET associated with a monitored search space. This RS may be referred to as a default TCI state for the PDSCH or default QCL assumption for the PDSCH.

The time offset between reception of DL DCI and reception of a PDSCH corresponding to the DCI may be referred to as scheduling offset.

The above-described threshold value may be referred to as a time duration for QCL, "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, and so on.

The time duration for QCL may be based on UE capability, for example, may be based on a delay in PDCCH decoding and beam switching. The time duration for QCL may be minimum time required for the UE to perform PDCCH reception and application of spatial QCL information received in DCI for PDSCH processing. The time duration for QCL may be represented by the number of symbols for each piece of subcarrier spacing, or may be represented by time (for example, μs). Information about the time duration for QCL may be reported as UE capability information to the base station from the UE, or may be configured for the UE with use of higher layer signaling from the base station.

For example, the UE may assume that a DMRS port for the above-described PDSCH is QCL with a DL-RS based on a TCI state activated with respect to a CORESET corresponding to the above-described lowest CORESET-ID. The latest slot may be, for example, a slot for receiving DCI to schedule the above-described PDSCH.

Note that the CORESET-ID may be an ID (ID for CORESET identification, controlResourceSetId) configured by an RRC information element "ControlResourceSet."

When any CORESETs are not configured for that CC (for the PDSCH), the default TCI state may be an activated TCI state capable of being applied to a PDSCH in an active DL BWP for the CC, the activated TCI state having the lowest ID.

In Rel. 16 or later versions, in a case where a PDSCH and a PDCCH to schedule the PDSCH are each present in a different component carrier (CC) (cross-carrier scheduling), if a PDCCH-to-PDSCH delay is shorter than the time duration for QCL or if a TCI state is absent in DCI for the scheduling, the UE may obtain QCL assumption for the scheduled PDSCH based on an active TCI state capable of being applied to a PDSCH in an active BWP for the scheduled cell, the active TCI state having the lowest ID.

(NR Multicast/Broadcast)

In Rel. 16 (or earlier versions) NR, unicast transmission is a basis for transmission of at least one of a signal and a channel (hereinafter expressed as a signal/channel) to the UE from an NW. In this case, it is assumed that an identical downlink (DL) data signal/channel (for example, downlink shared channel (PDSCH)) transmitted to a plurality of UEs from the NW is received by each UE with use of a plurality of reception occasions corresponding to a plurality of beams (or panels) of the NW.

Under ultra-high-density and high-traffic circumstances such as environments (for example, stadiums and the like) geographically crowded with multiple UEs, a case where a plurality of UEs receive an identical signal/channel simultaneously is assumed. In such a case, it is conceivable that, in order for multiple UEs to exist in an identical area and for each UE to receive an identical signal/channel, receiving the signal/channel by each UE using unicast can secure communication reliability, but lowers efficiency in resource usage.

In order for the UE to receive multicast/broadcast services, mechanisms for group scheduling are under study.

For example, scheduling of a multicast PDSCH by one or more pieces of DCI is under study. In this case, a size (payload size, overhead) of the DCI may become large.

Thus, the inventors of the present invention came up with the idea of a method for suppressing the size of DCI for scheduling of the multicast PDSCH.

Embodiments according to the present disclosure will be described in detail with reference to the drawings as follows. The radio communication methods according to respective embodiments may each be employed individually, or may be employed in combination.

(Radio Communication Method)

In the present disclosure, "A/B" and "at least one of A and B" may be interchangeably interpreted. In the present disclosure, a cell, a CC, a carrier, a BWP, an active DL BWP, an active UL BWP, and a band may be interchangeably interpreted. In the present disclosure, an index, an ID, an indicator, and a resource ID may be interchangeably interpreted. In the present disclosure, an RRC parameter, a higher layer parameter, an RRC information element (IE), and an RRC message may be interchangeably interpreted.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

In the present disclosure, multicast and broadcast may be interchangeably interpreted. A PDSCH using multicast, a PDSCH common to multiple UEs, a common PDSCH, a shared PDSCH, a multicast PDSCH, and a broadcast PDSCH may be interchangeably interpreted.

In the present disclosure, DL data, a codeword (CW), a transport block (TB), and a PDSCH may be interchangeably interpreted.

In the present disclosure, a beam, a TCI state, QCL assumption, a QCL parameter, a spatial domain reception filter, a UE spatial domain reception filter, a UE receive beam, a DL receive beam, DL precoding, a DL precoder, a DL-RS, an RS of QCL type D in a TCI state or QCL assumption, and an RS of QCL type A in a TCI state or QCL assumption may be interchangeably interpreted. In the present disclosure, a QCL type X-RS, a DL-RS associated with QCL type X, and a DL-RS, a DL-RS source, an SSB, or a CSI-RS having QCL type X may be interchangeably interpreted.

In the present disclosure, "X is QCLed with Y (X is quasi co-located (QCLed) with Y)," "X and Y are QCLed with QCL type D (X and Y are quasi co-located with 'QCL-Type D')," "X and Y are QCLed with respect to QCL type D (X and Y are quasi co-located with respect to 'QCL-Type D')," and "X and Y are in a relationship of QCL type D" may be interchangeably interpreted. X and Y may be RSs or RS resources.

In the present disclosure, a multicast PDSCH, broadcast information (cell information), and a paging channel may be interchangeably interpreted. For example, in NR Earthquake and Tsunami Warning System (ETWS), when detecting DCI in a dedicated search space (paging search space), the UE obtains information about Earthquake Early Warning by reading broadcast information (paging information).

In the present disclosure, an indication of reception/nonreception, DCI, a specific signal, and an RS may be interchangeably interpreted.

In the present disclosure, a PDSCH, a PDSCH resource, a reception occasion, an occasion, and DL data may be interchangeably interpreted.

The multicast PDSCH may deliver DL data for multiple UEs. Each of a plurality of reception occasions in the multicast PDSCH may deliver the same DL data, or may deliver different data.

In the multiple UEs, appropriate beams (best beams) may be different from each other. The plurality of reception occasions may each be associated with a plurality of QCL parameters (for example, beams, QCL assumption, and TCI states). DL data in each reception occasion may be transmitted (received) with use of a corresponding QCL parameter.

One piece of DL data may be one codeword (CW), or may be one transport block (TB). The same DL data may have the same size (for example, transport block size (TBS)), or may have different sizes.

It may be assumed that the base station does not transmit DL data simultaneously by using a plurality of beams.

The plurality of reception occasions to be multicasted may be one PDSCH. Each of the plurality of reception occasions to be multicasted may be one PDSCH.

First Embodiment

A multicast PDSCH resource (resource for a multicast PDSCH) may be (semi-statically) assigned by higher layer signaling (for example, an RRC information element (IE)).

DL data may be multicasted in a plurality of occasions (for example, PDSCHs) configured by the higher layer signaling. A UE may receive DL data in at least one occasion of the plurality of occasions, and may decode the DL data.

The RRC information element may indicate, for the multicast PDSCH, at least one of a time domain resource, a frequency domain resource, and a transmission periodicity.

The time domain resource may be represented by at least one of a start position (slot/symbol number) and a size (length, the number of slots/symbols). The frequency domain resource may be represented by at least one of a start position (PRB/subcarrier number) and a size (bandwidth, the number of PRBs/subcarriers).

The plurality of PDSCHs may have the same transmission periodicity (regular intervals). In an example of FIG. 1, intervals of adjacent PDSCHs are the same, and this interval is configured as the transmission periodicity.

Figure 2:
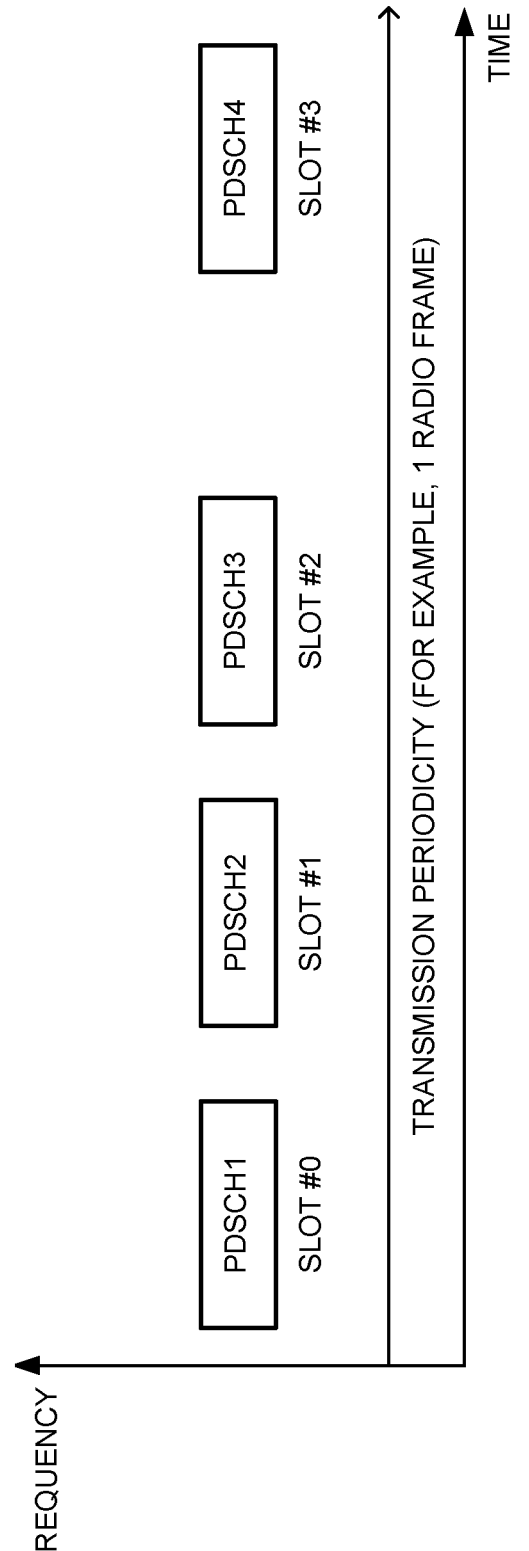
FIG. 2 is a diagram to show another example of the configuration of multicast PDSCH resources.

The time domain resource may be represented by time offset (slot/symbol number) in the transmission periodicity. The transmission periodicity may be a radio frame. In an example of FIG. 2, the transmission periodicity (time domain resource) is configured as slot numbers (slots #0, #1, #2, and #3) in one radio frame.

The UE may receive a signal (an indication of reception/non-reception, DCI, or a specific signal), and may determine the at least one occasion (for example, PDSCH) on the basis of the signal.

When the resource for the multicast PDSCH is configured by higher layer signaling and the multicast PDSCH is scheduled (when measurement/reception of the multicast PDSCH is indicated, when receiving an indication of reception of the multicast PDSCH), the UE may receive an indicated PDSCH, or may not receive a non-indicated PDSCH. The indication of the reception may be DCI.

Figure 3:
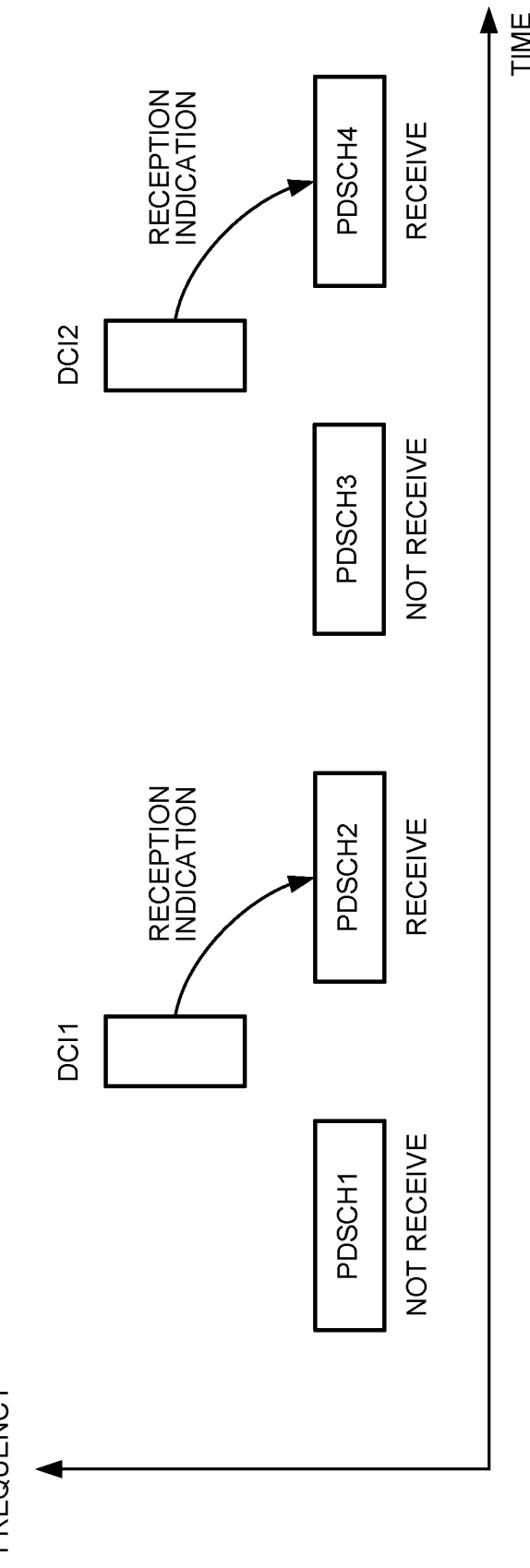
FIG. 3 is a diagram to show an example of a reception indication based on DCI.

In an example of FIG. 3, resources of PDSCHs 1 to 4 are configured by higher layer signaling. DCI 1 indicates reception of PDSCH 2 (is an indication of reception of PDSCH 2). The UE receives PDSCH 2 on the basis of DCI 1. DCI 2 indicates reception of PDSCH 4 (is an indication of reception of PDSCH 4). The UE receives PDSCH 4 on the basis of DCI 2. The UE does not receive non-indicated PDSCHs 1 and 3.

When the resource for the multicast PDSCH is configured for the UE by higher layer signaling and the UE does not receive a non-reception indication for the multicast PDSCH, the UE may receive the multicast PDSCH. When receiving the non-reception indication for the multicast PDSCH, the UE may not receive the multicast PDSCH. The indication of the non-reception may be DCI.

Figure 4:
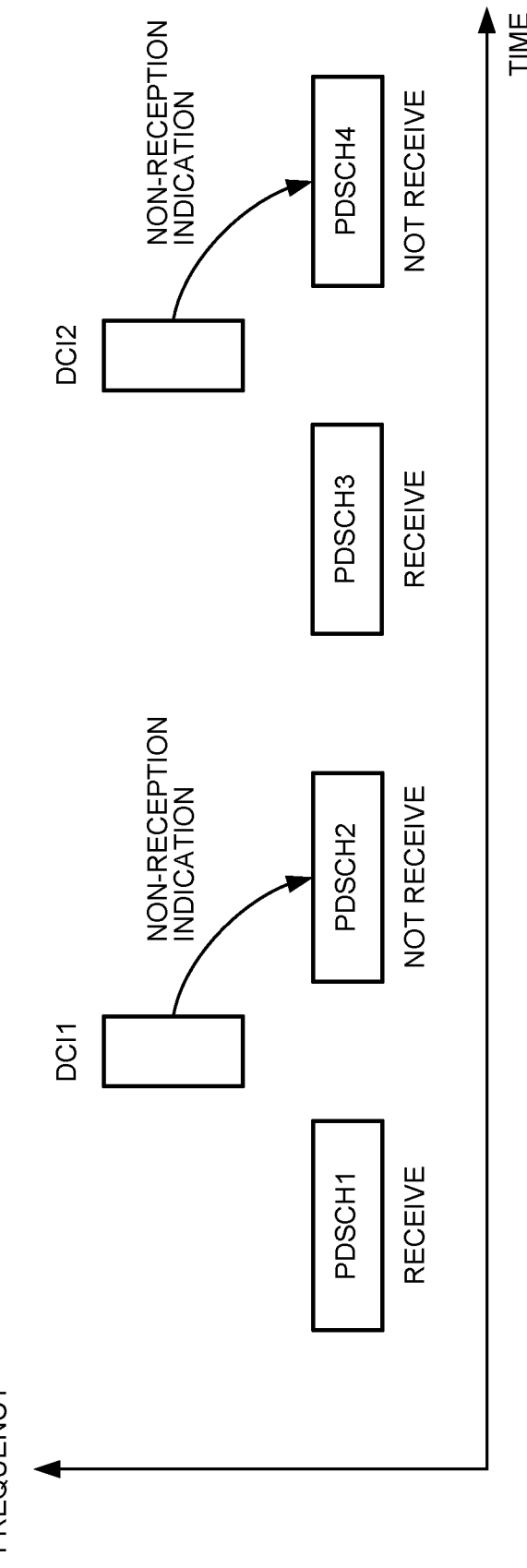
FIG. 4 is a diagram to show an example of a non-reception indication based on DCI.

In an example of FIG. 4, resources of PDSCHs 1 to 4 are configured by higher layer signaling. DCI 1 indicates non-reception of PDSCH 2 (is an indication of non-reception of PDSCH 2). The UE does not receive PDSCH 2 on the basis of DCI 1. DCI 2 indicates non-reception of PDSCH 4 (is an indication of non-reception of PDSCH 4). The UE does not receive PDSCH 4 on the basis of DCI 2. The UE receives non-indicated PDSCHs 1 and 3.

One piece of DCI may indicate N receptions/non-receptions. An N value may be configured by higher layer signaling, may be defined by specifications, may be reported by UE capability information from the UE, or may be indicated by DCI to indicate reception/non-reception. Therefore, DCI overhead can be suppressed.

Figure 5:
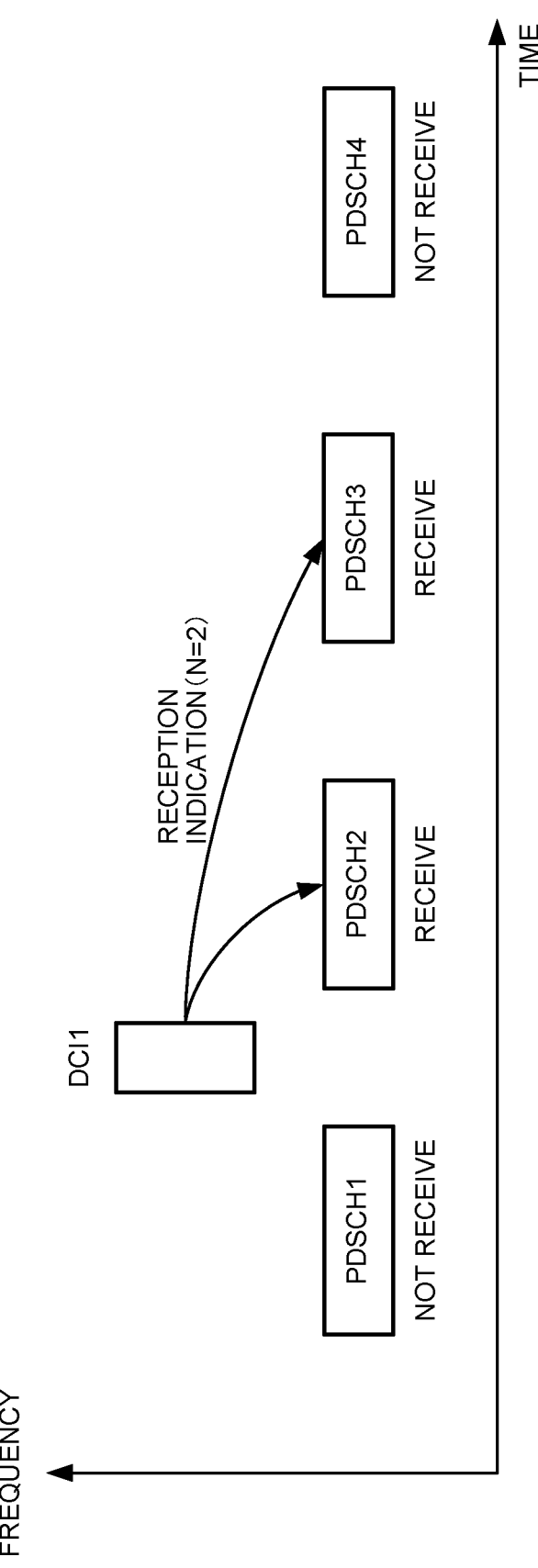
FIG. 5 is a diagram to show an example of DCI including N reception indications.

In an example of FIG. 5, resources of PDSCHs 1 to 4 are configured by higher layer signaling. DCI 1 indicates reception of PDSCHs 2 and 3 (is an indication of reception of PDSCHs 2 and 3). The UE receives PDSCHs 2 and 3 on the basis of DCI 1. The UE does not receive non-indicated PDSCHs 1 and 4.

The indication of the reception/non-reception may be a signal (for example, RS) from an NW in place of the DCI.

According to a first embodiment above, DCI overhead can be suppressed.

Second Embodiment

An indication of reception/non-reception may be indication in accordance with any one of indication methods 1 to 3 as follows.

<<Indication Method 1>>

The indication of reception/non-reception is notified by DCI.

The indication of reception/non-reception may be an existing DCI format (DCI format defined in specifications of Rel. 16 (or earlier versions)).

In at least one of a case where multicast/broadcast is configured by higher layer signaling and a case where DCI having a cyclic redundancy check (CRC) scrambled by a radio network temporary identifier (RNTI) for multicast/broadcast is detected, a specific field of the existing DCI format may be interpreted as a parameter for multicast/broadcast.

The specific field may include a bit indicating reception or non-reception. The remaining bit in the specific field may indicate the above-mentioned N.

In the existing DCI format, when a first field is a specific value, a second field different from the first field may be used for the indication of reception/non-reception. The specific value may be a value invalid (inapplicable) in Rel. 16 (unicast). The first field and specific value may be a field and specific value used for validation of activation/deactivation of semi-persistent transmission (DL semi-persistent scheduling (SPS), type 2 configured grant, or the like).

The existing DCI format may be a DCI format (for example, DCI format 2_1) for the interruption (interruption, preemption). The RNTI used for CRC scrambling in the existing DCI format may be an INT-RNTI.

The indication of reception/non-reception may be a new DCI format (DCI format not defined in specifications of Rel. 16 (or earlier versions)).

A size of the new DCI format may be different from a size of the existing DCI format. The size of the new DCI format may be smaller than the size of the existing DCI format.

The DCI for the indication of reception/non-reception may include a specific field for the indication of reception/non-reception.

The specific field may include one or more bits indicating a reception indication or a non-reception indication.

The specific field may be m bits including any one of a non-reception indication and N in a reception indication. For example, when m is 2, the specific field may indicate any one of a non-reception indication, reception indication (N=1), reception indication (N=2), and reception indication (N=3). A field different from the specific field may indicate N.

The DCI for the indication of reception/non-reception (DCI for reception/non-reception indication) may not include a field for an explicit indication of reception/non-reception. A UE may judge, depending on whether the DCI for reception/non-reception indication has been detected, whether reception/non-reception has been indicated.

DCI format 1_0 having a CRC scrambled by a C-RNTI includes a frequency domain resource assignment (FDRA)

field, a time domain resource assignment (TDRA) field, a virtual resource block (VRB)-to-physical resource block (PRB) mapping field, a new data indicator (NDI) field, a redundancy version (RV) field, an HARQ process number (HPN) field, a downlink assignment index (DAI) field, a scheduled PUCCH transmit power control (TPC) command field, a PUCCH resource indicator field, and a PDSCH-to-HARQ feedback timing indicator field.

When a multicast PDSCH resource is configured by higher layer signaling, in the DCI for reception/non-reception indication, at least one of the FDRA field, the TDRA field, and the VRB-to-PRB mapping field may be omitted. When a plurality of candidates for the multicast PDSCH resource are configured by higher layer signaling, in the DCI for reception/non-reception indication, at least one size of the FDRA field, the TDRA field, and the VRB-to-PRB mapping field may be reduced.

The DCI for reception/non-reception indication may include at least one of the NDI field, the RV field, the HPN field, the DAI field, and the PDSCH-to-HARQ feedback timing indicator field. When at least one field of the NDI field, the RV field, the HPN field, the DAI field, and the PDSCH-to-HARQ feedback timing indicator field is not used for a multicast PDSCH, the DCI for reception/non-reception indication may not include the field.

When there is a possibility that the UE transmits HARQ-ACK information for the multicast PDSCH in the PUCCH, the DCI for reception/non-reception indication may include at least one of a PUCCH TPC command field and a PUCCH resource indicator field. When there is no possibility that the UE transmits HARQ-ACK information for the multicast PDSCH in the PUCCH, the DCI for reception/non-reception indication may not include at least one of the PUCCH TPC command field and the PUCCH resource indicator field.

<<Indication Method 2>>

The indication of reception/non-reception is notified by a specific signal. The specific signal may be an RS.

Information related to the indication of reception/non-reception may be notified depending on whether the specific signal is transmitted, or may be notified by a resource of the specific signal (specific signal resource). For example, the specific signal resource may be a sequence (for example, base sequence numbers/cyclic shift indices) used for the specific signal, or may be received power of the specific signal (for example, an energy per resource element (EPRE), a ratio of an EPRE of the specific signal to an EPRE of another signal). Such another signal may be a reference signal, such as an SSB, a secondary synchronization signal (SSS), a CSI-RS, or a DMRS.

When multicast/broadcast is configured by higher layer signaling and the specific signal resource for reception/non-reception indication is configured, the UE may monitor/measure the configured specific signal resource. When the specific signal is detected in the specific signal resource, when the specific signal having a specific sequence is detected in the specific signal resource, or when received power of the specific signal (an EPRE, a ratio of received power of the specific signal to received power of another signal) is higher than a threshold value, the UE assumes that an indication of reception or non-reception of a multicast/broadcast PDSCH has been notified.

Figure 6:
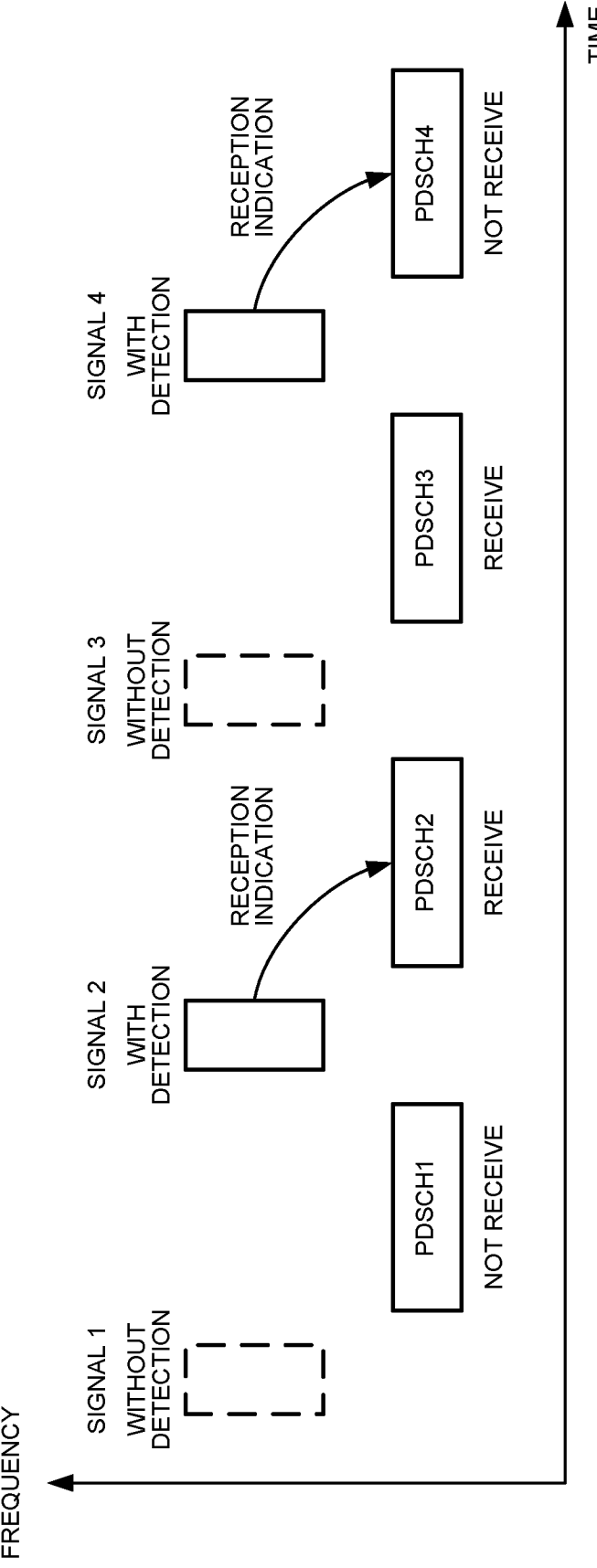
FIG. 6 is a diagram to show an example of an indication based on the presence or absence of a specific signal.

In an example of FIG. 6, resources of PDSCHs 1 to 4 are configured by higher layer signaling. Resources 1 to 4 of the specific signal for PDSCHs 1 to 4 are each configured by the higher layer signaling. The UE detects the specific signal in resources 2 and 4. The UE receives PDSCH 2 corresponding to resource 2 in which the specific signal has been detected, and receives PDSCH 4 corresponding to resource 4 in which the specific signal has been detected. The UE does not receive PDSCH 1 corresponding to resource 1 in which the specific signal has been detected, and does not receive PDSCH 3 corresponding to resource 3 in which the specific signal has been detected.

The resource for reception/non-reception indication may be notified to the UE by higher layer signaling/physical layer control information. The resource for reception/non-reception indication may be configured as a UE-dedicated resource, or may be configured as a resource common among a plurality of UEs.

The resource for reception/non-reception indication may be notified by at least one parameter of parameters 1 to 5 as follows.

{Parameter 1}

A time resource. The time resource may be represented by at least one of a start timing, an end timing, and a size (length).

{Parameter 2}

A measurement periodicity. The measurement periodicity may be represented by a slot or ms, or may be represented by a parameter similar to a search space/CORESET.

{Parameter 3}

A frequency resource. The frequency resource may be represented by at least one of a start frequency, an end frequency, a size (bandwidth), and a comb index. The frequency resource may be represented by a bit map.

{Parameter 4}

A transmit signal sequence. The transmit signal sequence may be represented by at least one of a base sequence number and a cyclic shift index.

{Parameter 5}

Transmit/received power. The transmit/received power may be represented by an EPRE. The transmit/received power may be represented by a ratio of an EPRE of the specific signal to an EPRE of another signal.

A plurality of candidates for the specific signal resource (parameter) may be assigned. A plurality of candidates for the sequence may each be associated with each of a plurality of values of information related to the indication of reception/non-reception. The information related to the indication of reception/non-reception may be at least one of N, a time/frequency/code resource of the multicast/broadcast PDSCH, and the number of MIMO layers (the number of DMRS ports).

For example, the plurality of candidates for the specific signal resource may be a plurality of candidates for a base sequence number/cyclic shift index of a sequence of the specific signal, or may be a plurality of levels (ranges) of received power of the specific signal.

The UE may derive the information related to the indication of reception/non-reception on the basis of a DMRS of the multicast PDSCH (the information related to the indication of reception/non-reception may be indicated implicitly). The specific signal may be the DMRS of the multicast PDSCH.

Figures 7A, 7B:
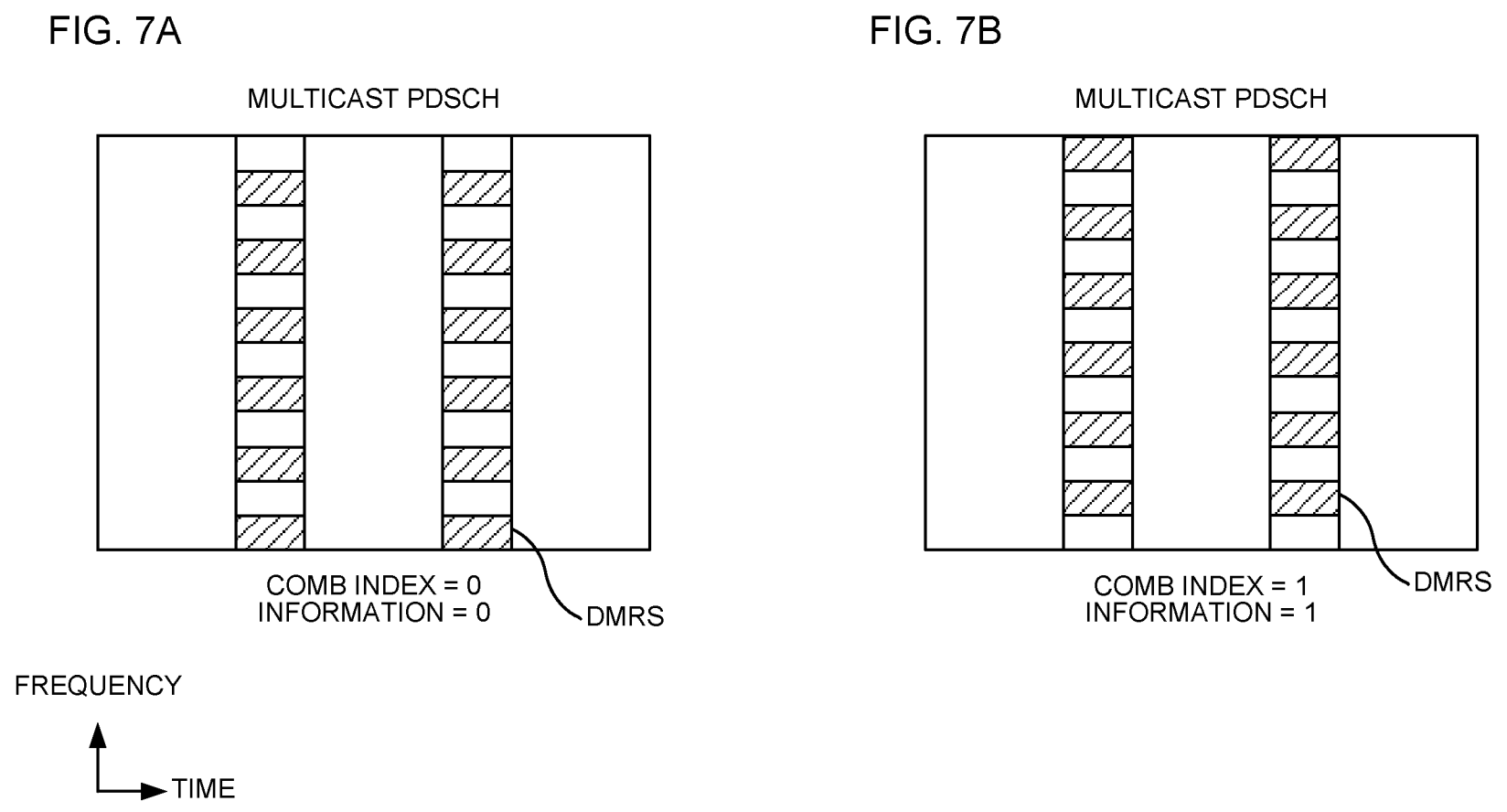

In examples of FIGS. 7A and 7B, comb 2 is configured for the DMRS of the multicast PDSCH. Comb index 0 in an example of FIG. 7A is associated with a value 0 of the information related to the indication of reception/non-reception. Comb index 1 in an example of FIG. 7B is associated with a value 1 of the information related to the indication of reception/non-reception.

The UE starts reception of a PDSCH before receiving the indication of reception/non-reception. The UE buffers a received signal (stores the received signal in a memory)

regardless of the presence or absence of an indication of reception/non-reception of the PDSCH. The UE may judge, depending on the presence or absence of the indication of reception/non-reception, whether to demodulate/decode a buffered PDSCH.

The UE may derive the information related to the indication of reception/non-reception on the basis of some resources of the multicast PDSCH (some resources, judgment resource, or specific signal resource of an OFDM symbol of data) (the information related to the indication of reception/non-reception may be indicated implicitly).

The judgment resource may be assigned in a UE-dedicated manner, and may be configured by higher layer signaling. The UE may judge the presence or absence of the indication of reception/non-reception on the basis of whether the specific signal has been detected in the judgment resource.

Figures 8A, 8B:
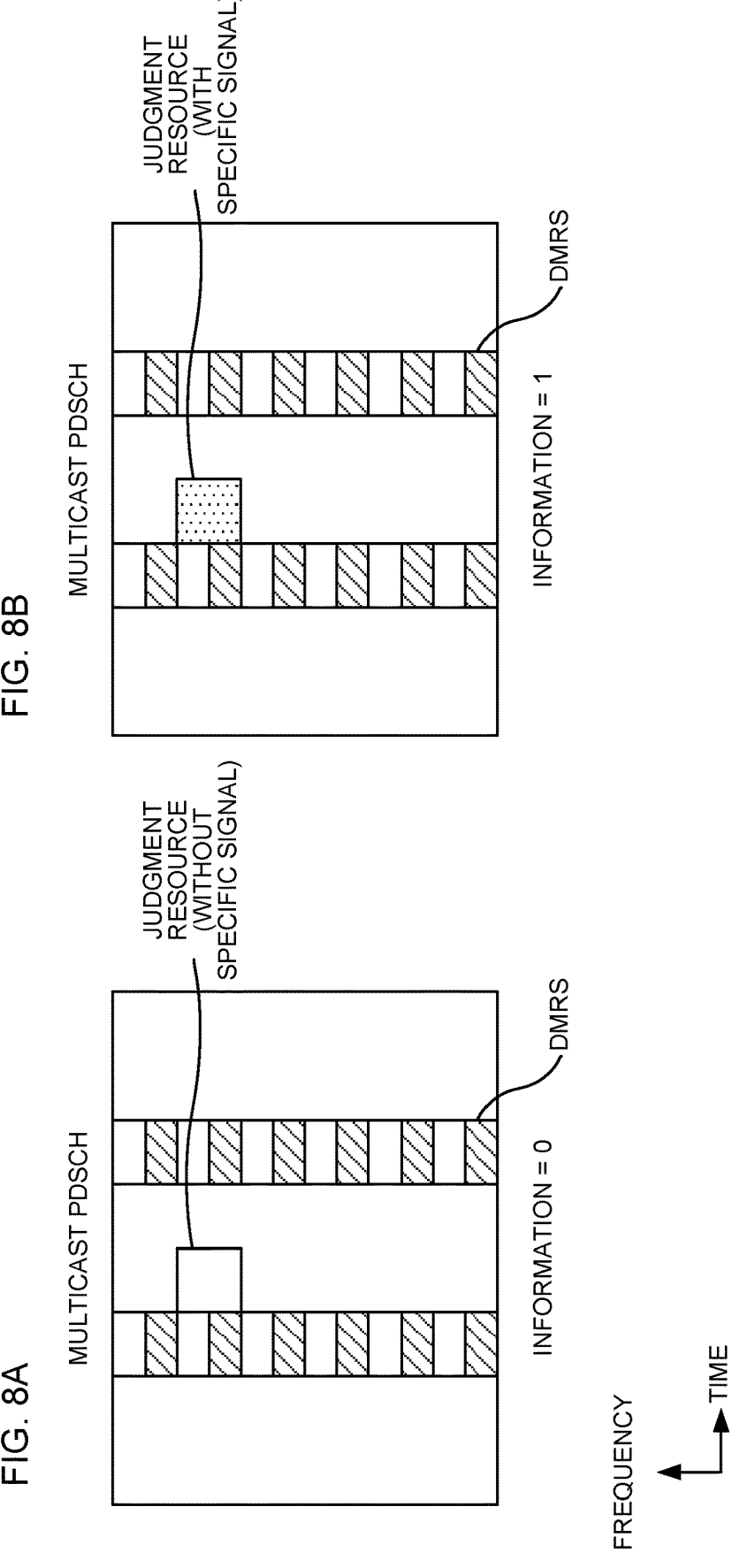
FIGS. 8A and 8B are each a diagram to show an example of an indication based on a judgment resource.

In examples of FIGS. 8A and 8B, some resources of the multicast PDSCH are configured as the judgment resource. In the judgment resource of an example of FIG. 8A, the specific signal is not transmitted. When the specific signal is not detected in the judgment resource, the UE judges that the indication of reception/non-reception is absent. In the judgment resource of an example of FIG. 8B, the specific signal is transmitted. When the specific signal is detected in the judgment resource, the UE judges that the indication of reception/non-reception is present.

The specific signal may be a sequence, a pseudo random (pseudo noise (PN)) sequence, a complex symbol delivered by the judgment resource, or the like.

The judgment resource may be reserved (data may not be mapped).

When the specific signal is not transmitted, a PDSCH may be punctured in the judgment resource (the PDSCH may not be rate-matched around the judgment resource). In a case where the specific signal is a reception indication, the UE can decode the PDSCH even when the UE incorrectly detects the specific signal in the judgment resource.

When the specific signal is not transmitted, a PDSCH may be rate-matched around the judgment resource. In a case where the specific signal is a non-reception indication, the UE does not decode the PDSCH when the UE incorrectly detects the specific signal in the judgment resource.

A plurality of judgment resources may be assigned to each of a plurality of UEs. In this case, all judgment resources are configured for the UE. A PDSCH is rate-matched around all judgment resources.

Figure 9:
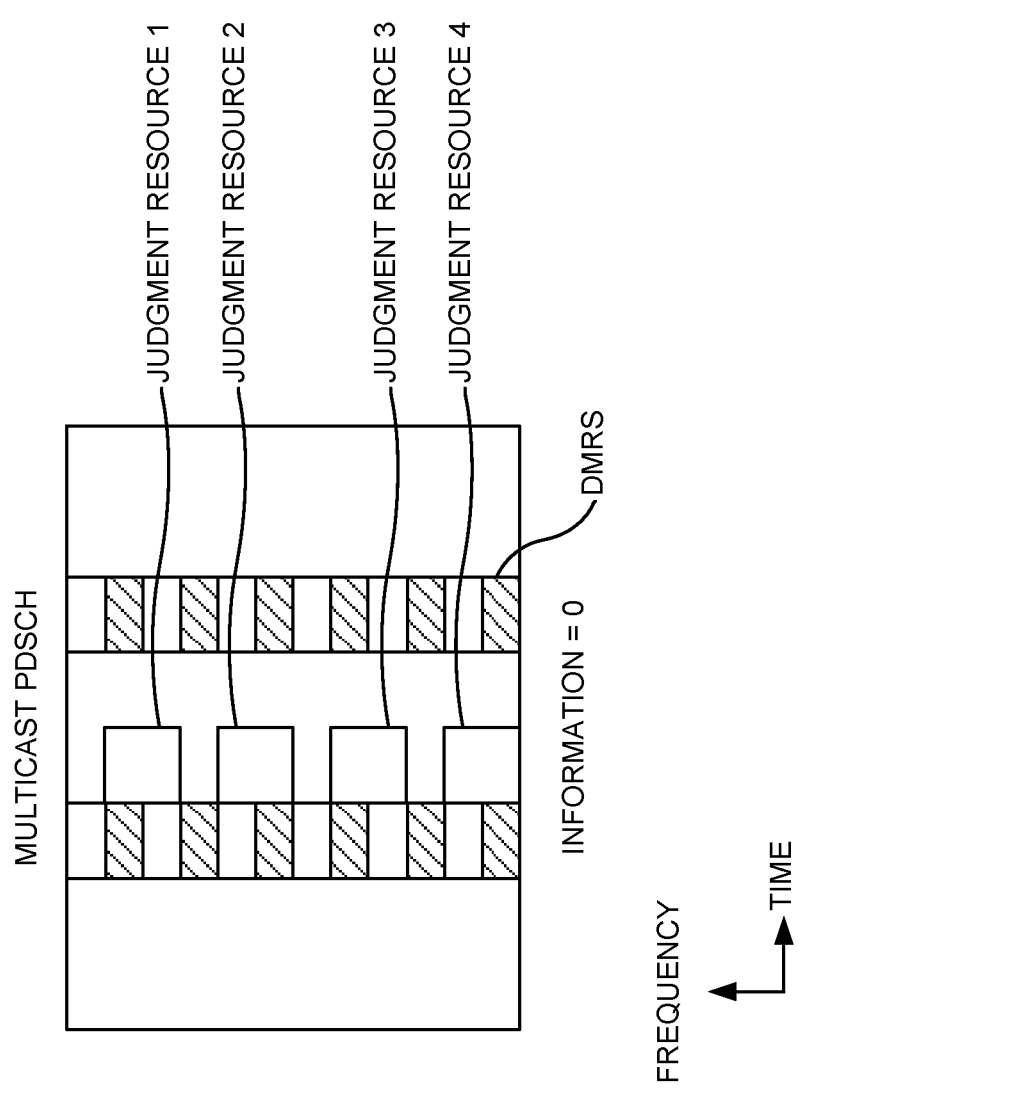
FIG. 9 is a diagram to show an example of an indication based on a plurality of judgment resources.

In an example of FIG. 9, the UE decodes a PDSCH rate-matched around judgment resources 1 to 4.

The UE may judge an indication of reception/non-reception addressed to the UE itself on the basis of a result of detection of the specific signal in a judgment resource corresponding to the UE itself. For example, when judgment resource 2 corresponds to the UE itself, the UE may judge, on the basis of a result of detection of the specific signal in judgment resource 2, whether to receive the multicast PDSCH.

The judgment resource may be a resource to which the DMRS is not mapped by a comb configuration (resource to which the DMRS is mapped in a comb configuration not configured for the DMRS). For example, when comb index=0 of FIG. 7A is used for the multicast PDSCH and comb index=1 of FIG. 7B is not used for the multicast PDSCH, resource elements (REs) to which the DMRS of FIG. 7B is mapped are not used. The judgment resource may be these REs.

<<Indication Method 3>>

The indication of reception/non-reception is notified by specific information in the multicast PDSCH.

The specific information may be a specific field.

A position of the specific field may be defined in specifications, or may be configured by higher layer signaling. The specific field may be a field in a MAC CE delivered by the multicast PDSCH.

The UE may perform demodulation/decoding of the multicast PDSCH, and may judge whether the decoded specific field is a reception/non-reception indication addressed to the UE itself. When the specific field is a reception indication addressed to the UE itself (the specific field is not a non-reception indication addressed to the UE itself), the UE may obtain a decoding result (may transmit the decoding result to a higher layer). When the specific field is not a reception indication addressed to the UE itself (the specific field is a non-reception indication addressed to the UE itself), the UE may discard the decoding result.

The multicast PDSCH may include a plurality of specific fields. The plurality of specific fields may correspond to a plurality of respective UEs. The UE may refer to a specific field corresponding to the UE itself out of the plurality of specific fields in the multicast PDSCH.

The specific information may be a UE ID list. The UE ID may be a specific type of RNTI (for example, a C-RNTI).

The UE ID list may indicate a UE that receives the multicast PDSCH (receiving UE, addressed UE).

The UE may perform demodulation/decoding of the multicast PDSCH, and may judge whether the decoded UE ID list includes a UE ID for the UE itself. When the UE ID list includes the UE ID for the UE itself, the UE may obtain a decoding result (may transmit the decoding result to a higher layer). When the UE ID list does not include the UE ID for the UE itself, the UE may discard the decoding result.

The UE ID list may indicate a UE that does not receive the multicast PDSCH (non-receiving UE).

The UE may perform demodulation/decoding of the multicast PDSCH, and may judge whether the decoded UE ID list includes a UE ID for the UE itself. When the UE ID list does not include the UE ID for the UE itself, the UE may obtain a decoding result (may transmit the decoding result to a higher layer). When the UE ID list includes the UE ID for the UE itself, the UE may discard the decoding result.

According to a second embodiment above, the UE can appropriately judge whether to receive the multicast PDSCH.

Third Embodiment

Whether an indication of reception/non-reception is applied to a multicast PDSCH may be determined on the basis of a time relationship between the indication of reception/non-reception and the multicast PDSCH.

The indication of reception/non-reception may be applied to a PDSCH satisfying an application condition. The application condition may be application conditions 1 or 2.

{Application Condition 1}

Figures 10A, 10B:
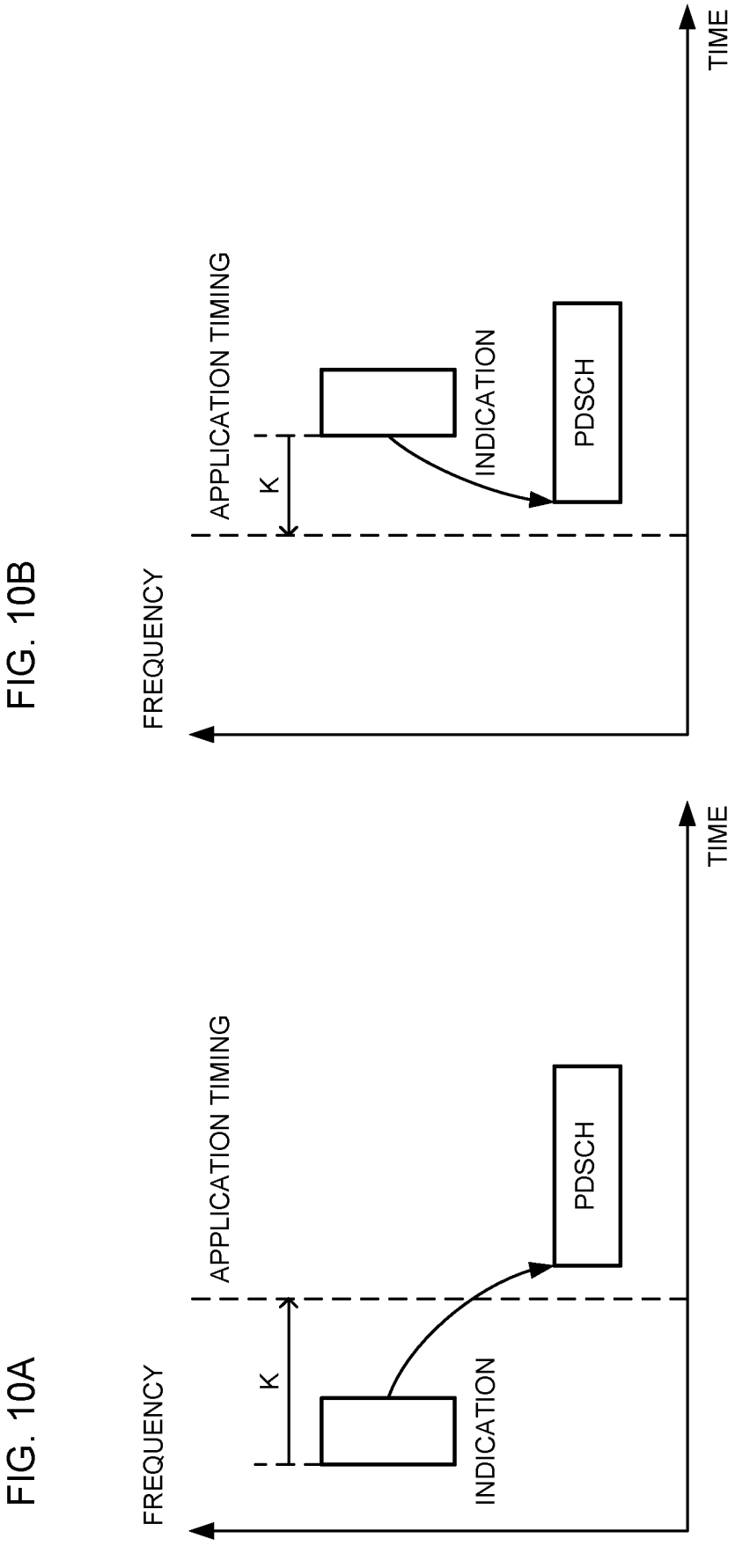
FIGS. 10A and 10B are each a diagram to show an example of a timing of application of an indication.

As shown in an example of FIG. 10A, an indication of reception/non-reception may be applied to a PDSCH having a start timing after a timing (application timing) after specific time from the indication. The specific time may be represented as K symbols/K slots/K ms.

When K is small, a buffer capacity is necessary for storing the PDSCH, but a UE can promptly judge the indication of reception/non-reception.

{Application Condition 2}

As shown in an example of FIG. 10B, an indication of reception/non-reception may be applied to a PDSCH having a start timing after a timing (application timing) before specific time from the indication. The specific time may be represented as K' symbols/K' slots/K' ms.

When K' is low, a buffer capacity for storing the PDSCH can be suppressed.

In the application condition, an end timing of the PDSCH may be used in place of the start timing of the PDSCH.

The UE may not assume reception of a PDSCH not satisfying the application condition (may not receive the PDSCH not satisfying the application condition).

The indication of reception/non-reception based on indication method 2 of the second embodiment may be applied to the PDSCH not satisfying the application condition.

A value (K or K') indicating the specific time may be defined in specifications, may be configured by higher layer signaling, or may be reported by UE capability information from the UE.

According to a third embodiment above, the UE can appropriately determine a PDSCH to which an indication of reception/non-reception is applied.

Fourth Embodiment

On the basis of a resource for an indication of reception/non-reception (indication resource), a multicast PDSCH to which the indication is applied may be determined.

The indication resource may be a timing of the indication of reception/non-reception (indication timing). The multicast PDSCH to which the indication is applied may be based on determination method 1 or 2 as follows.

{Determination Method 1}

Figures 11A, 11B:
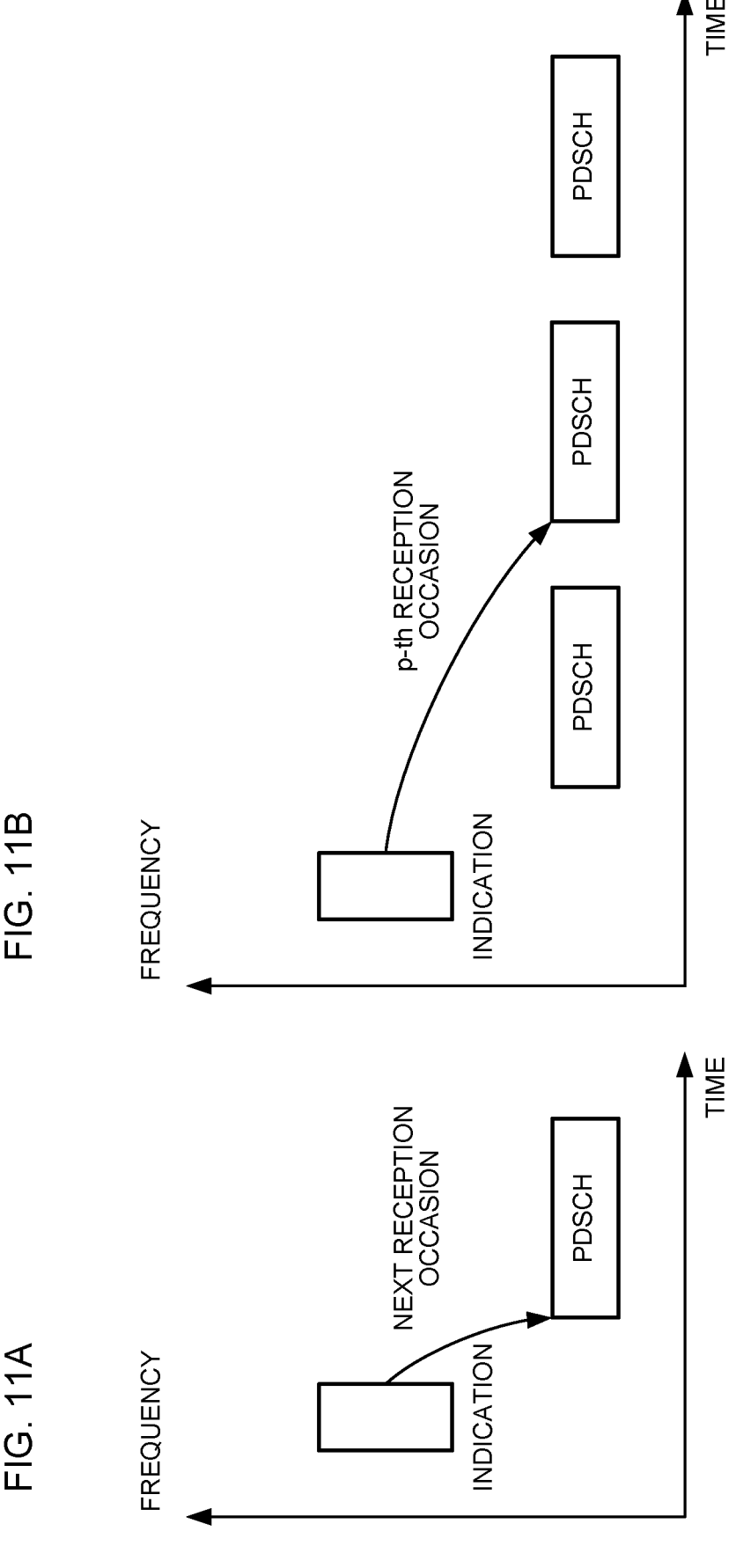
FIGS. 11A and 11B are each a diagram to show an example of an indication based on an indication timing.

The indication of reception/non-reception may indicate a PDSCH (reception occasion) following the indication timing (FIG. 11A), or may indicate a next PDSCH (reception occasion) after specific time from the indication timing.

{Determination Method 2}

The indication of reception/non-reception may indicate the p-th PDSCH (reception occasion) from the indication timing (FIG. 11B), or may indicate the p-th PDSCH (reception occasion) from a timing after specific time from the indication timing.

The specific time may be represented as K symbols/K slots/K ms.

At least one of p and K may be configured by higher layer signaling, and may not be indicated by the indication of reception/non-reception.

For at least one of p and K, a plurality of values may be configured by higher layer signaling, or may be defined in specifications. One of the plurality of values may be indicated by the indication of reception/non-reception.

A UE may receive a PDSCH indicated by the indication of reception/non-reception. Similarly to N of the first embodiment, the UE may receive N PDSCHs with the PDSCH indicated by the indication of reception/non-reception in the lead.

According to a fourth embodiment above, it is possible to appropriately determine, on the basis of the resource for the indication of reception/non-reception, a PDSCH to be received.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
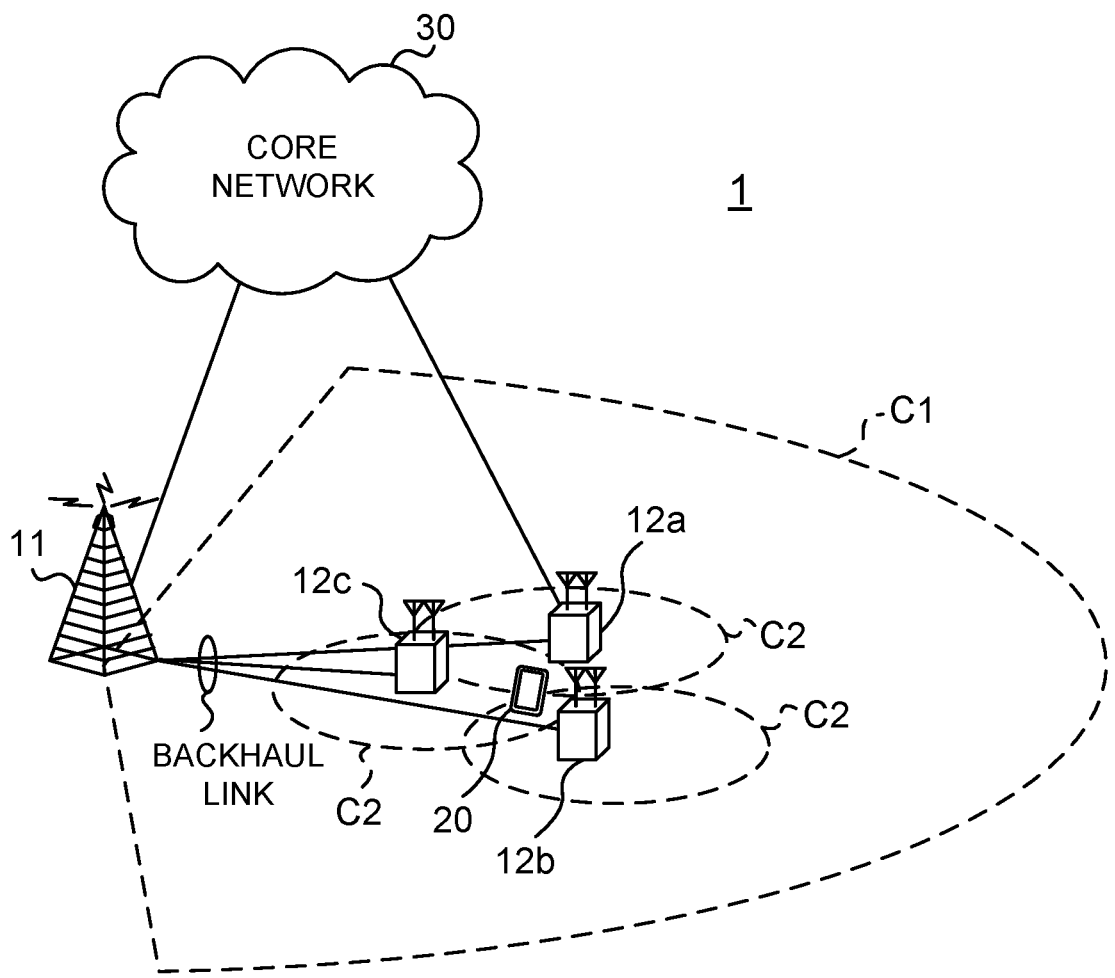
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
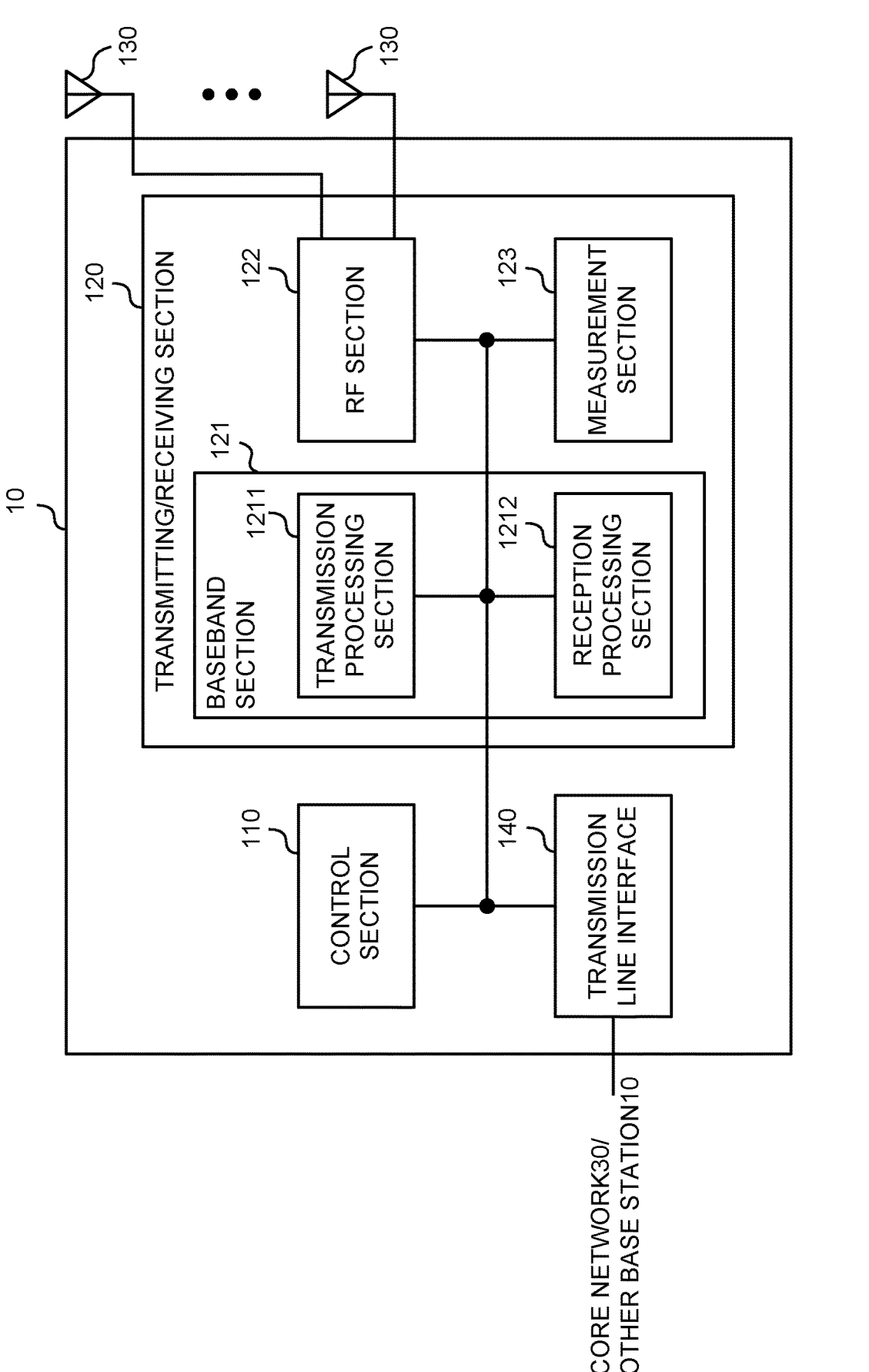
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate a bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The control section 110 may control data multicast in a plurality of occasions configured by higher layer signaling. The transmitting/receiving section 120 may transmit an indication of at least one occasion of the plurality of occasions.

(User Terminal)

Figure 14:
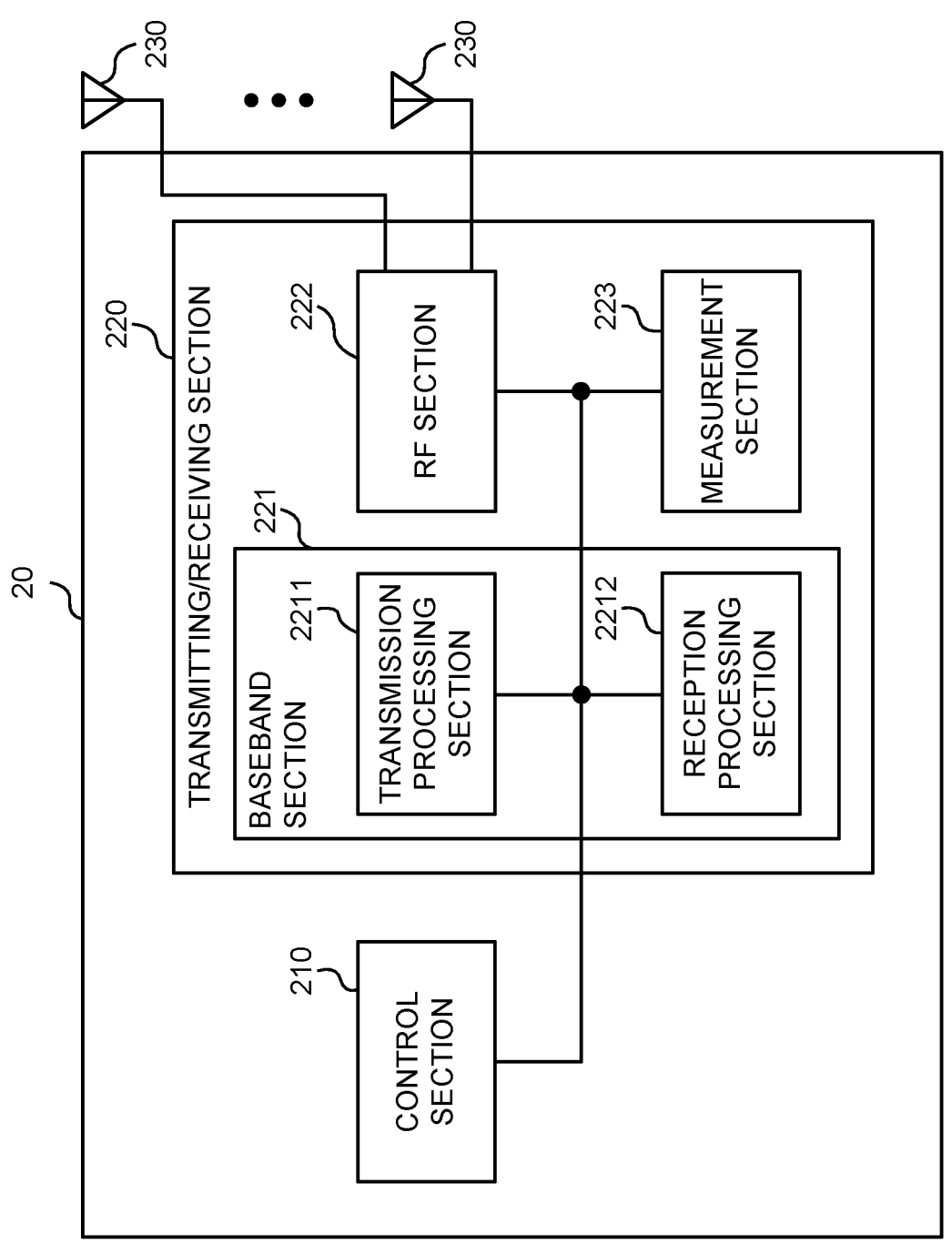
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate a bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive data in at least one occasion of a plurality of occasions configured by higher layer signaling, the data being multicasted in the plurality of occasions. The control section 210 may decode the data.

The transmitting/receiving section 220 may receive a signal. The control section 210 may determine the at least one occasion on the basis of the signal.

The signal may indicate any one of the at least one occasion (for example, reception indication) and a non-received occasion (for example, non-reception indication) out of the plurality of occasions.

The signal may be transmitted in a resource (for example, a specific signal resource or a judgment resource) in resources of a physical downlink shared channel to deliver the data.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
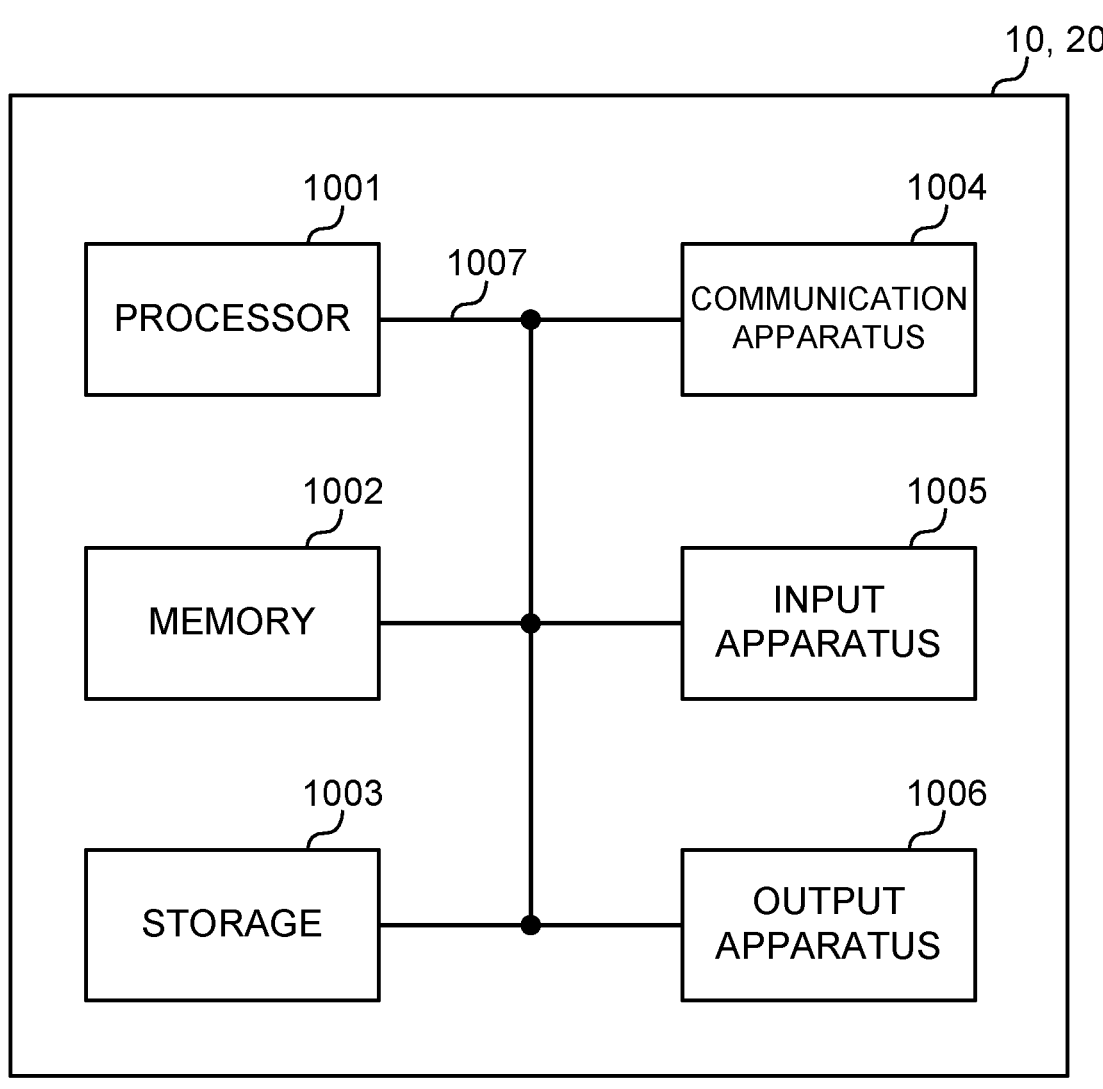
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives, by higher layer signaling, configuration that indicates a transmission periodicity between a plurality of time domain resources of a multicast physical downlink shared channel (PDSCH)

that is configured to deliver downlink data to a plurality of terminals, and receives downlink control information (DCI) for scheduling the multicast PDSCH; and a processor that determines, based on the DCI, whether or not to receive the multicast PDSCH in two or more time domain resources after the DCI, among the plurality of time domain resources, wherein the DCI includes a time domain resource assignment field, a first field and a second field, when the first field indicates a specific value used for validation for activation or deactivation of a downlink semi-persistent scheduling or a configured grant, the second field indicates whether or not to receive the multicast PDSCH in the two or more time domain resources, and wherein the second field is different from the first field, and the first field and the second field are different from the time domain resource assignment field.

2. The terminal according to claim 1, wherein the DCI is transmitted with cyclic redundancy check (CRC) that is scrambled by multicast radio network temporary identifier (RNTI).

3. A radio communication method for a terminal, comprising:

receiving, by higher layer signaling, configuration that indicates a transmission periodicity between a plurality of time domain resources of a multicast physical downlink shared channel (PDSCH) that is configured to deliver downlink data to a plurality of terminals;

receiving downlink control information (DCI) for scheduling the multicast PDSCH; and determining, based on the DCI, whether or not to receive the multicast PDSCH in two or more time domain resources after the DCI, among the plurality of time domain resources, wherein the DCI includes a time domain resource assignment field, a first field and a second field, when the first field indicates a specific value used for validation for activation or deactivation of a downlink semi-persistent scheduling or a configured grant, the second field indicates whether or not to receive the multicast PDSCH in the two or more time domain resources, and wherein the second field is different from the first field, and the first field and the second field are different from the time domain resource assignment field.

4. A base station comprising:

a transmitter that transmits, by higher layer signaling, configuration that indicates a transmission periodicity between a plurality of time domain resources of a multicast physical downlink shared channel (PDSCH) that is configured to deliver downlink data to a plurality of terminals; and a processor that controls to transmit downlink control information (DCI) for scheduling the multicast PDSCH, the DCI indicating whether or not to make a terminal receive the multicast PDSCH in two or more time domain resources after the DCI, among the plurality of time domain resources, wherein the DCI includes a time domain resource assignment field, a first field and a second field, when the first field indicates a specific value used for validation for activation or deactivation of a downlink semi-persistent scheduling or a configured grant, the second field indicates whether or not to make the terminal receive the multicast PDSCH in the two or more time domain resources, and wherein the second field is different from the first field, and the first field and the second field are different from the time domain resource assignment field.

5. A system comprising:

a terminal that comprises:

a receiver that receives, by higher layer signaling, configuration that indicates a transmission periodicity between a plurality of time domain resources of a multicast physical downlink shared channel (PDSCH) that is configured to deliver downlink data to a plurality of terminals, and receives downlink control information (DCI) for scheduling the multicast PDSCH; and a processor that determines, based on the DCI, whether or not to receive the multicast PDSCH in two or more time domain resources after the DCI, among the plurality of time domain resources, and a base station that transmits the configuration, wherein the DCI includes a time domain resource assignment field, a first field and a second field, when the first field indicates a specific value used for validation for activation or deactivation of a downlink semi-persistent scheduling or a configured grant, the second field indicates whether or not to receive the multicast PDSCH in the two or more time domain resources, and wherein the second field is different from the first field, and the first field and the second field are different from the time domain resource assignment field.

* * * * *